(12) United States Patent
Von Wendorff

(10) Patent No.: US 7,245,667 B2
(45) Date of Patent: Jul. 17, 2007

(54) METHOD OF TRANSMITTING DATA

(75) Inventor: Wilhard Christophorus Von Wendorff, München (DE)

(73) Assignee: Infineon Technologies AG, Munich (DE)

( * ) Notice: Subject to any disclaimer, the term of this patent is extended or adjusted under 35 U.S.C. 154(b) by 578 days.

(21) Appl. No.: 09/968,451

(22) Filed: Oct. 1, 2001

(65) Prior Publication Data
US 2002/0085487 A1    Jul. 4, 2002

Related U.S. Application Data

(63) Continuation of application No. PCT/DE00/00981, filed on Mar. 31, 2000.

(30) Foreign Application Priority Data
Mar. 31, 1999    (DE) ................................ 199 14 742

(51) Int. Cl.
  *H04L 27/00*    (2006.01)
  *H04L 27/36*    (2006.01)
(52) U.S. Cl. ...................................... 375/295; 375/260
(58) Field of Classification Search ................ 375/260, 375/259, 295, 285, 296, 244; 714/819, 820, 714/821, 712; 367/117; 370/336, 343, 345, 370/536; 327/379
See application file for complete search history.

(56) References Cited

U.S. PATENT DOCUMENTS

| | | | | |
|---|---|---|---|---|
| 3,781,795 A | * | 12/1973 | Zegers | .......................... 714/774 |
| 4,011,542 A | * | 3/1977 | Baichtal et al. | ............. 340/515 |
| 4,245,344 A | * | 1/1981 | Richter | ........................ 714/43 |
| 4,276,645 A | * | 6/1981 | Lager et al. | ................. 714/797 |
| 4,298,982 A | * | 11/1981 | Auerbach | .................... 714/746 |
| 4,447,903 A | * | 5/1984 | Sewerinson | .................. 714/821 |
| 5,051,991 A | * | 9/1991 | Szczutkowski | ............. 370/519 |
| 5,268,907 A | * | 12/1993 | Suzuki et al. | ............... 714/712 |
| 5,329,528 A | * | 7/1994 | Akai et al. | ................... 370/445 |
| 5,386,424 A | | 1/1995 | Driscoll et al. | |
| 5,422,929 A | * | 6/1995 | Hurst et al. | .................... 379/4 |
| 5,446,747 A | | 8/1995 | Berrou | |
| 5,541,657 A | * | 7/1996 | Yamamoto et al. | ....... 348/388.1 |

(Continued)

FOREIGN PATENT DOCUMENTS

DE    38 36 206 A1    4/1990

(Continued)

OTHER PUBLICATIONS

Giuliano Benelli: "Two New Coding Techniques for Diversity Communication Systems", IEEE Transactions on Communications, vol. 38, No. 9, Sep. 1990, pp. 1530-1538.

*Primary Examiner*—Robert Pascal
*Assistant Examiner*—K. M. Flanagan
(74) *Attorney, Agent, or Firm*—Laurence A. Greenberg; Werner H. Stemer; Ralph E. Locher

(57) ABSTRACT

In a data transmission method, the data to be transmitted and/or data corresponding to the same are transmitted via a first transmission channel and in addition via a second transmission channel. The data transmitted via the first transmission channel and the data transmitted via the second transmission channel are transmitted with a defined delay relative to one another. The data received through the two channels are then compared in order to determine whether a transmission error has occurred.

6 Claims, 2 Drawing Sheets

U.S. PATENT DOCUMENTS

| | | | |
|---|---|---|---|
| 5,621,851 A | * | 4/1997 | Moriya et al. .............. 704/212 |
| 5,687,103 A | * | 11/1997 | Hagl et al. .................. 702/150 |
| 5,761,245 A | | 6/1998 | Haukkavaara et al. |
| 6,014,374 A | * | 1/2000 | Paneth et al. ............... 370/345 |
| 6,418,550 B1 | * | 7/2002 | Heinrich ..................... 714/816 |
| 6,487,535 B1 | * | 11/2002 | Smyth et al. ............... 704/500 |
| 6,526,031 B1 | * | 2/2003 | Zaff et al. ................... 370/335 |
| 6,862,434 B2 | * | 3/2005 | Wallace et al. ............ 455/101 |
| 6,901,242 B2 | * | 5/2005 | Kroeger et al. ............... 455/45 |
| 6,996,160 B2 | * | 2/2006 | Li et al. ..................... 375/148 |
| 7,020,821 B2 | * | 3/2006 | Chang ........................ 714/746 |
| 2004/0028015 A1 | * | 2/2004 | Fouilland et al. ........... 370/337 |

FOREIGN PATENT DOCUMENTS

| | | |
|---|---|---|
| EP | 0 260 603 A2 | 3/1988 |
| GB | 2 237 706 A | 5/1991 |

\* cited by examiner

METHOD OF TRANSMITTING DATA

CROSS-REFERENCE TO RELATED APPLICATION

This application is a continuation of copending International Application No. PCT/DE00/00981, filed Mar. 31, 2000, which designated the United States.

BACKGROUND OF THE INVENTION

FIELD OF THE INVENTION

The invention relates to a data transmission method. The data to be transmitted and/or data corresponding to the latter are thereby transmitted over a first transmission channel and additionally over a second transmission channel.

Methods of transmitting data are known in a wide variety of configurations.

In the simplest case, the data to be transmitted are transmitted once over a transmission channel of some kind or other. In particular on account of the increasingly demanding requirements for the amount of data to be transmitted per unit of time, but also because of the ever-decreasing distances between electrical and electronic components influencing one another, data transmissions are increasingly subject to interferences. Electromagnetic influences, in particular, often cause data transmissions to be affected by interference. Such interferences may have the consequence that the data sent and the data received do not coincide.

In order to render data transmission more reliable, one may consider transmitting data to be transmitted (data blocks) repeatedly (for example twice in succession). This is illustrated by way of example in FIG. 3. By a comparison of the data corresponding to one another, performed after the data transmission, it can be established whether errors have occurred during the transmission of the data. If the data corresponding to one another are still identical after transmission of the same, it can be assumed that the data transmission has taken place without errors. In the case of that type of transmission error control, however, if it is intended or necessary for a prescribed data transmission rate to be maintained, it would be required to operate at twice the data transmission rate.

Another possible way of making the data transmission more reliable is to transmit the data to be transmitted and the data inverted with respect to the latter simultaneously on two transmission channels. This is practiced for example in the case of data transmissions taking place in accordance with the CAN standard or in accordance with the TTP/C standard and is illustrated in FIG. 4. Here, too, it can be established by a comparison of the data corresponding to one another, taking place after the data transmission, whether errors have occurred during the transmission of the same. The data (to be compared) transmitted over the plurality of transmission channels cannot, however, be sampled exactly simultaneously if the expenditure is to be kept within reasonable limits. In particular in the case of high-frequency interference, this may have the result that the sampled values are affected differently by the interference. Under some circumstances, this may have the consequence that uncritical interferences are regarded as serious interferences and/or that serious interferences are not detected.

In general terms, the novel method according to the instantly disclosed invention may be characterized as belonging to the second of the above-mentioned data transmission methods.

Of the above data transmission methods, both are disadvantageous, because errors occurring during the data transmission cannot be detected and/or can only be detected without errors with a very high expenditure.

SUMMARY OF THE INVENTION

It is accordingly an object of the invention to provide a data transmission method, which overcomes the above-mentioned disadvantages of the heretofore-known devices and methods of this general type and which renders it possible in a simple way for interferences of the data transmission that are to be taken seriously to be detected, and indeed only for interferences that are to be taken seriously to be detected as such.

With the foregoing and other objects in view there is provided, in accordance with the invention, a data transmission method, which comprises the following steps:

transmitting data (i.e., the data to be transmitted and/or data corresponding to it) over a first transmission channel and additionally over a second transmission channel;

thereby transmitting the data over the first transmission channel and the data over the second transmission channel with a time offset relative to one another; and checking whether the data transmitted over the first transmission channel and the data transmitted over the second transmission channel correspond to one another.

In other words, the data transmitted over the first transmission channel and the data transmitted over the second transmission channel are transmitted with a time offset in relation to one another, i.e., corresponding time instants of the data lag one another.

Because interferences in the data transmission generally occur only very rarely, if at all, and then only very briefly (otherwise the system concerned would be unusable), they can only ever affect one of the data stream portions corresponding to one another—because of the transmission at offset times of the data corresponding to one another. With an adequate time offset of the data transmission on the different transmission channels, there is a high probability that, at most, one of the data stream portions corresponding to one another will be affected by interference. Thus, if data stream portions corresponding to one another are compared, it can be determined beyond any doubt whether one of the data stream portions corresponding to one another was subject to interference.

Because the data stream portions transmitted at offset times are transmitted over dedicated transmission channels, the time offset of the transmission of the data corresponding to one another can be freely selected. The free selectability of the time offset makes it possible for this to be optimally set. As a result, it can be selected such that on the one hand only one of the sets of data corresponding to one another is in each case affected by one and the same interference, and that on the other hand the detection of interferences present can take place very soon after the transmission of the data transmitted first.

This makes it possible for serious errors in the data transmission, and only serious errors, to be detected as such quickly and with great reliability.

In accordance with an added feature of the invention, the method comprises differently coding the data transmitted with a time offset over the first transmission channel and over the second transmission channel.

In accordance with an additional feature of the invention, the transmitting step comprises transmitting the data to be transmitted themselves over one of the transmission channels and transmitting data corresponding to the data to be transmitted over the other transmission channel.

In accordance with a concomitant feature of the invention, the data transmitted over the first transmission channel are inverted relative to the data transmitted over the second transmission channel. That is, either channel may carry the data to be transmitted in inverted form. Other features which are considered as characteristic for the invention are set forth in the appended claims.

Although the invention is illustrated and described herein as embodied in a method of transmitting data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The method of transmitting data considered in more detail here is intended in particular for applications in which particularly reliable data transmission is important. Such applications are, for example, but certainly by no means exclusively, the controlling of the antilock braking system or the airbag control system of a motor vehicle.

The method is not subject to any restrictions with regard to the length and type of transmission channels. The transmission channels may be electrical or optical conductors, radio channels, or other transmission channels.

Figure 1:
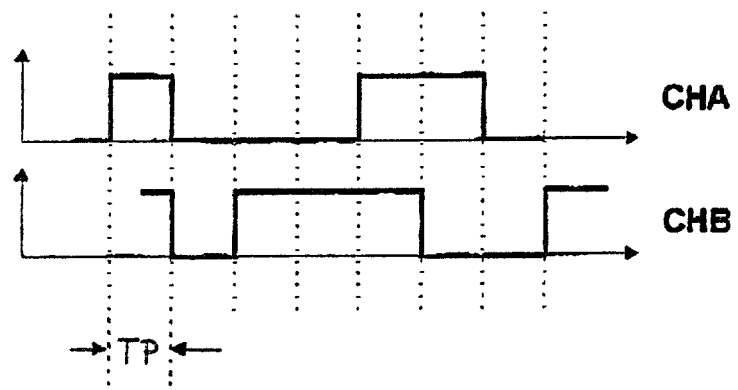
FIG. 1 is a timing diagram illustrating the type of data transmission according to the invention and described in more detail below.

Referring now to the figures of the drawing in detail and first, particularly, to FIG. 1 thereof, the data transmission takes place over two transmission channels. These two transmission channels are denoted in FIGS. 1 and 2 by CHA and CHB. The data to be transmitted are transmitted twice in the example considered, once inverted over the first transmission channel CHA, and once noninverted and with a time offset over the second transmission channel CHB.

The term "time offset" here means that the data transmitted over the second transmission channel CHB are transmitted later than the data transmitted over the first transmission channel. It goes without saying that the exact opposite may also be the case: the noninverted data may also be transmitted before the inverted data.

In the exemplary embodiment under consideration here, the data transmitted over the second transmission channel CHB are transmitted one clock period TP after the data transmitted over the first transmission channel CHA. This time difference may be set differently, both in terms of magnitude and in terms of algebraic sign.

The shorter the time difference of the data transmitted over the different transmission channels, the earlier it can be established on the receiving side whether the transmitted data are or may be affected by interference.

The longer the time difference of the data transmitted over the different transmission channels, on the other hand, the lower the probability that, of data corresponding to one another, both the data transmitted over the first transmission channel CHA and the data transmitted over the second transmission channel CHB are influenced by the same interference. The probability that the data corresponding to one another are influenced by different interferences is extremely small, since interferences generally occur only very rarely (otherwise the system would be unusable). If, of data corresponding to one another, both are affected (by the same or different interferences), this may have the result that the interferences cancel each other out and are not detected in the comparison of the data corresponding to one another carried out for error detection. Since interferences possibly occurring are not only very rare but also very brief (otherwise the system would likewise be unusable), the probability that interferences present in data stream portions corresponding to one another cancel one another out in the comparison of the data corresponding to one another carried out for error detection can be reduced to a minimum just by a relatively short time offset in the transmission of the data corresponding to one another.

Figure 2:
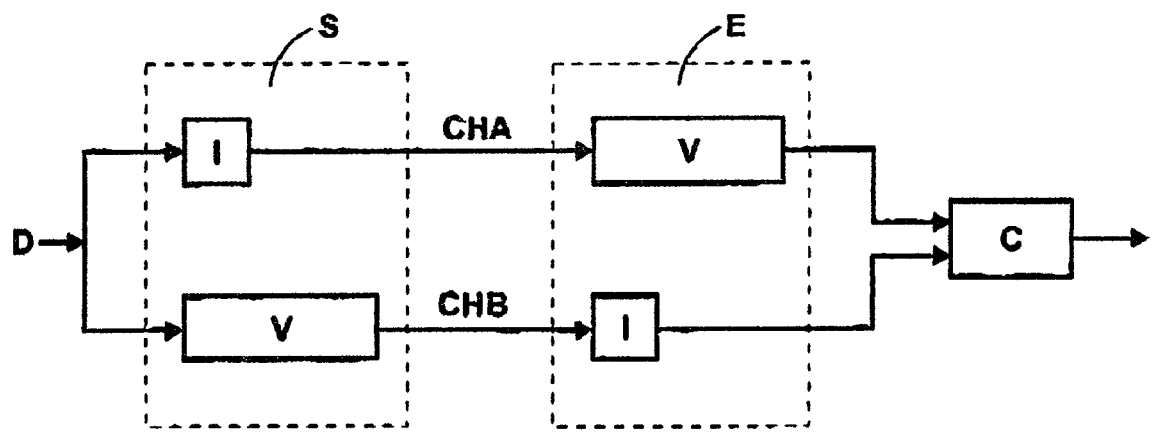
FIG. 2 is a schematic block diagram of the basic construction of devices for generating and checking data transmitted in the case of data transmissions of the type illustrated in FIG. 1.
Figure 3:
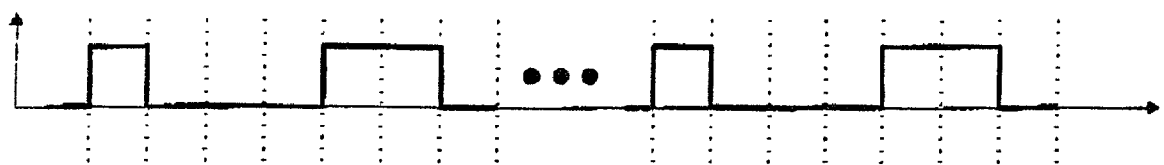
FIG. 3 is a timing diagram illustrating a data transmission in which data are transmitted repeatedly over the same transmission channel.
Figure 4:
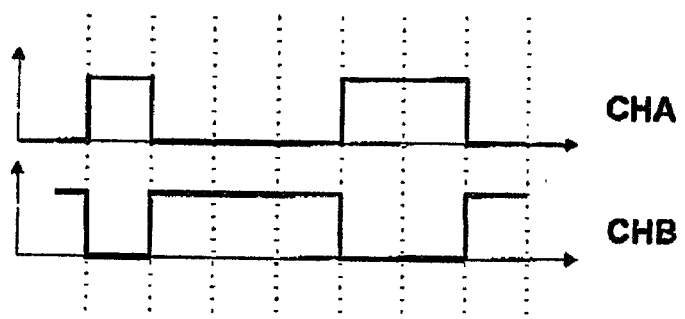
FIG. 4 is a timing diagram illustrating a data transmission in which data and data inverted with respect to the latter are transmitted simultaneously over two transmission channels.

A possible construction of devices for generating and checking the data which are to be transmitted or are being transmitted over the transmission channels is illustrated in FIG. 2.

The transmitting device (provided on the transmitting side) for generating the data to be transmitted over the transmission channels CHA and CHB is denoted in FIG. 2 by the designation S. The receiving device (provided on the receiving side, i.e. at the other end of the transmission channels CHA and CHB) for checking the data transmitted over the transmission channels CHA and CHB is denoted in FIG. 2 by the designation E.

The (data-generating) device S includes an inverter I and a delay element V, which may be formed for example by a FIFO memory. It receives the data D to be transmitted as an input signal and generates from this a first data stream, which is output onto the first transmission channel CHA, and a second data stream, which is output onto the second transmission channel CHB. To generate the first data stream which is output (onto the first transmission channel CHA), the data D input are inverted by the inverter I. The data transmitted over the first transmission channel CHA are consequently the inverse of the data D actually to be transmitted.

To generate the second data stream which is output (onto the second transmission channel CHB), the data D input are delayed by the delay element V. The delay is selected such that the data output onto the second transmission channel CHB are output later by a predetermined time than the data corresponding to them are output onto the first transmission channel CHA. It must be taken into account here that the generation of the data to be output onto the first transmission channel CHA (the inversion of the data D by the inverter I) also takes a certain amount of time. The data transmitted over the second transmission channel CHB are the data D that are actually to be transmitted, but are transmitted with a delay.

Because, as already mentioned above, the generation of the data to be output onto the first transmission channel CHA generally does not take place without a time delay, under some circumstances it could be possible to dispense with the delay element V; even without this delay element, data corresponding to one another would be passed to the transmission channels CHA and CHB at different points in time.

The delay element V may also be used for delaying the data to be output onto the first transmission channel CHA. Then, the data D actually to be transmitted would be transmitted over the second transmission channel CHB and the data inverted and delayed in comparison with the latter would be transmitted over the first transmission channel CHA.

The (data-checking) device E is designed such that it complements the (data-generating) device S; it processes data received over the first transmission channel CHA in the same way as the data D to be transmitted were processed for output onto the second transmission channel CHB, and it processes data received over the second transmission channel CHB in the same way as the data D to be transmitted were processed for output onto the first transmission channel CHA. It accordingly likewise includes an inverter I and a delay element V, the data obtained over the first transmission channel CHA being delayed by the delay element V, and the data obtained over the second transmission channel CHB being inverted by the inverter I.

The data generated and output by the delay element V and the data generated and output by the inverter I should he the same if the data transmission took place without errors over both transmission channels; if the transmission of the data transmitted over the first transmission channel CHA or the transmission of the data transmitted over the second transmission channel CHB was affected by interference, the data output by the delay element V and the data output by the inverter I differ.

Whether the data output by the delay element V and the data output by the inverter I are the same is checked by a comparator C.

If it is established by the comparator C that the data to be compared are the same, this means that the transmission channels CHA and CHB were not affected by interference during the transmission of these data, and, accordingly, the data to be compared can be regarded as being without errors.

If, on the other hand, it is established by the comparator C that the data to be compared are not the same, this means that the first transmission channel CHA and/or the second transmission channel CHB were affected by interference during the transmission of these data, and, accordingly, the data to be compared cannot be regarded as being without errors. These data are preferably not used any further.

It is possible to respond in various ways to the establishment of a data transmission affected by errors. The various responses are generally likely to share the common feature that the data that are not without errors beyond any doubt are not used (are ignored). In addition, it may be possible to request a renewed transmission of the data concerned and/or to control the system in such a way as to bring it at least temporarily into a defined (stable) state.

In the exemplary embodiment under consideration here, the data to be transmitted themselves are transmitted over one of the transmission channels and data inverted in comparison with the latter are transmitted over the other transmission channel. Although this variant currently appears to be the simplest and most effective, there is no restriction to this. In principle, data coded differently in any way desired can be transmitted over the different transmission channels. It is not necessary in this respect for the data to be transmitted to be transmitted themselves over one of the transmission channels.

It is also possible for the same data to be transmitted over the different transmission channels, the number of which may, incidentally, be greater than two without restriction, these data being the data to be transmitted themselves or data corresponding to the latter.

Irrespective of the details of how it is implemented in practice, it is possible by the described method of transmitting data to detect without errors interferences that are possibly present.

I claim:

1. A data transmission method, which comprises the steps of:
   transmitting data over a first transmission channel;
   delaying the data transmitted over a first transmission channel and transmitting the delayed data over a second transmission channel;
   receiving the data transmitted over the first transmission channel and the data transmitted over the second transmission channel;
   delaying the data received over the first transmission channel; and
   checking whether the delayed data received over the first transmission channel and the delayed data transmitted over the second transmission channel correspond to one another.

2. The data transmission method according to claim 1, wherein the transmitting step comprises selectively transmitting the data to be transmitted and data corresponding to the data to be transmitted.

3. The data transmission method according to claim 1, which comprises differently coding the data transmitted with a time offset over the first transmission channel and over the second transmission channel.

4. The data transmission method according to claim 1, wherein the transmitting step comprises transmitting the data to be transmitted themselves over one of the transmission channels and transmitting data corresponding to the data to be transmitted over the other transmission channel.

5. The data transmission method according to claim 1, wherein the data transmitted over the first transmission channel are inverted relative to the data transmitted over the second transmission channel.

6. A data transmission method, which comprises the steps of:
   providing a data signal simultaneously to a first inverter and to a first time delay element;
   simultaneously transmitting the output of the first inverter over a first transmission channel and the output of the first time delay element over a second channel;
   receiving the data transmitted over the first transmission channel and the data transmitted over the second transmission channel;
   providing the data received over the first transmission channel to a second delay element;
   providing the data received over the second transmission channel to a second inverter; and
   checking whether the output of the second delay element and the output of the second inverter correspond to one another.

* * * * *